(12) United States Patent
Yoo et al.

(10) Patent No.: US 10,277,265 B2
(45) Date of Patent: Apr. 30, 2019

(54) CASE ASSEMBLY FOR MOBILE TERMINAL

(71) Applicant: LG ELECTRONICS INC., Seoul (KR)

(72) Inventors: Joonhee Yoo, Seoul (KR); Inseok Yoo, Seoul (KR); Kihyoung Kim, Seoul (KR); Jaewook Lee, Seoul (KR); Sooyong Song, Seoul (KR); Kiyoung Kim, Seoul (KR); Yeongtaek Kang, Seoul (KR); Taehyun Kim, Seoul (KR); Jinhwan Lee, Seoul (KR); Suhyeong Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/562,252

(22) PCT Filed: Dec. 4, 2015

(86) PCT No.: PCT/KR2015/013188
§ 371 (c)(1),
(2) Date: Sep. 27, 2017

(87) PCT Pub. No.: WO2016/167437
PCT Pub. Date: Oct. 20, 2016

(65) Prior Publication Data
US 2018/0083663 A1    Mar. 22, 2018

(30) Foreign Application Priority Data

Apr. 15, 2015  (KR) .......................... 10-2015-0053265

(51) Int. Cl.
*H04B 1/3888*    (2015.01)
*A45F 5/00*    (2006.01)
(Continued)

(52) U.S. Cl.
CPC ............. *H04B 1/3888* (2013.01); *A45F 5/00* (2013.01); *H04M 1/0202* (2013.01);
(Continued)

(58) Field of Classification Search
CPC combination set(s) only.
See application file for complete search history.

(56) References Cited

U.S. PATENT DOCUMENTS 9,164,547 B1 * 10/2015 Kwon ................... G06F 1/1656
9,507,390 B2 * 11/2016 Jang ..................... H05K 9/0075
(Continued)

FOREIGN PATENT DOCUMENTS

JP        2008-211839 A      9/2008
KR    10-2012-0029546 A      3/2012
(Continued)

*Primary Examiner* — Cindy Trandai
(74) *Attorney, Agent, or Firm* — Birch, Stewart, Kolasch & Birch, LLP

(57) ABSTRACT

The present invention relates to a case assembly for a mobile terminal. The case assembly according to an aspect includes a rear surface case detachably coupled to a rear surface of a terminal body to cover the rear surface of the terminal body, a rear cover coupled to a rear surface of the rear surface case to protect the rear surface of the rear surface case, and an adhesive sheet provided between the rear surface case and the rear cover to provide an adhesive force to opposite surfaces so as to couple the rear cover to the rear surface of the rear surface case, wherein adhesive parts configured to couple the rear cover and the rear surface case to each other along an edge of the rear surface case are formed in the edge of the rear surface case and an area of the rear cover, which covers the edge of the rear surface case.

9 Claims, 14 Drawing Sheets

(51) Int. Cl.
 *H04M 1/02* (2006.01)
 *H04M 1/18* (2006.01)
(52) U.S. Cl.
 CPC ... *A45F 2200/0516* (2013.01); *H04M 1/0283* (2013.01); *H04M 1/185* (2013.01)

(56) References Cited

U.S. PATENT DOCUMENTS

| | | | | |
|---|---|---|---|---|
| 9,794,382 | B2* | 10/2017 | Yang | G06F 1/165 |
| 2004/0087333 | A1* | 5/2004 | Hutchison | H01H 13/70 |
| | | | | 455/550.1 |
| 2012/0044115 | A1* | 2/2012 | McCaughey | H01Q 1/243 |
| | | | | 343/702 |
| 2012/0228168 | A1* | 9/2012 | Kitchen | A45C 11/182 |
| | | | | 206/307 |
| 2014/0051480 | A1* | 2/2014 | Cruz | H04B 1/3838 |
| | | | | 455/566 |
| 2014/0159980 | A1* | 6/2014 | Finegold | H01Q 1/245 |
| | | | | 343/833 |
| 2014/0194168 | A1* | 7/2014 | Lehmann | H04B 1/3838 |
| | | | | 455/575.5 |
| 2014/0246609 | A1* | 9/2014 | DeBaun | G21F 1/125 |
| | | | | 250/515.1 |
| 2015/0295615 | A1* | 10/2015 | Smith | A45C 5/02 |
| | | | | 455/575.8 |
| 2016/0087358 | A1* | 3/2016 | Kim | H01R 12/7076 |
| | | | | 439/68 |
| 2016/0106012 | A1* | 4/2016 | Jang | H05K 9/0086 |
| | | | | 361/679.26 |
| 2016/0186985 | A1* | 6/2016 | Kim | F25D 29/005 |
| | | | | 362/23.12 |
| 2016/0337757 | A1* | 11/2016 | Ozasa | H04M 1/035 |
| 2017/0275511 | A1* | 9/2017 | Takamori | C08K 5/11 |

FOREIGN PATENT DOCUMENTS

| | | |
|---|---|---|
| KR | 10-1221899 B1 | 1/2013 |
| KR | 10-132740 B1 | 11/2013 |
| KR | 10-2014-0065085 A | 5/2014 |

* cited by examiner

[Figure 1]
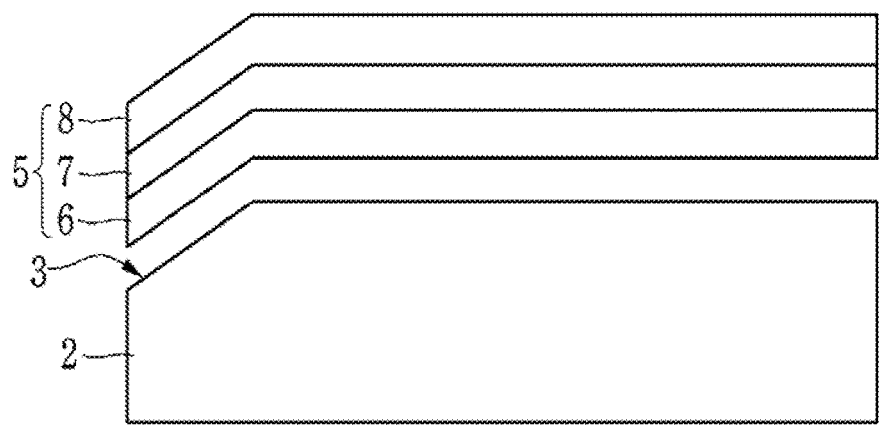
[Figure 2]
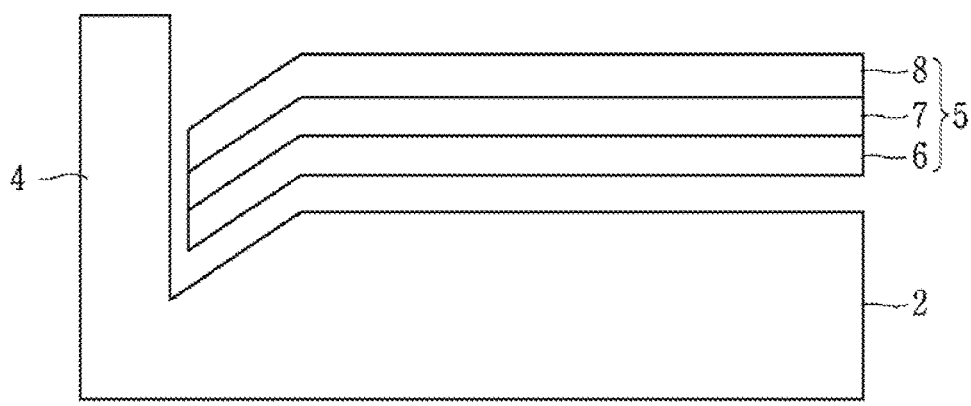

[Figure 3]
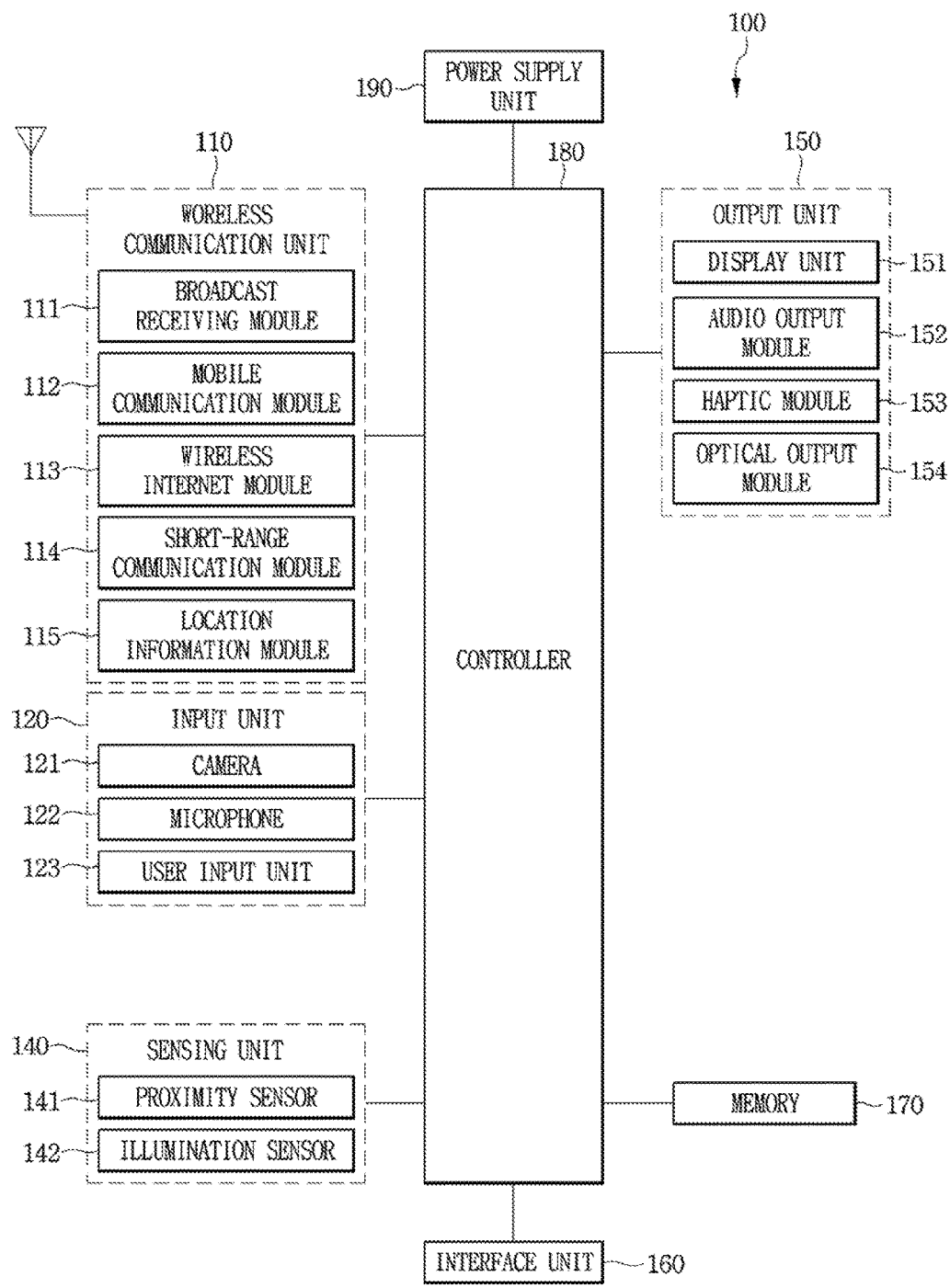

[Figure 4]
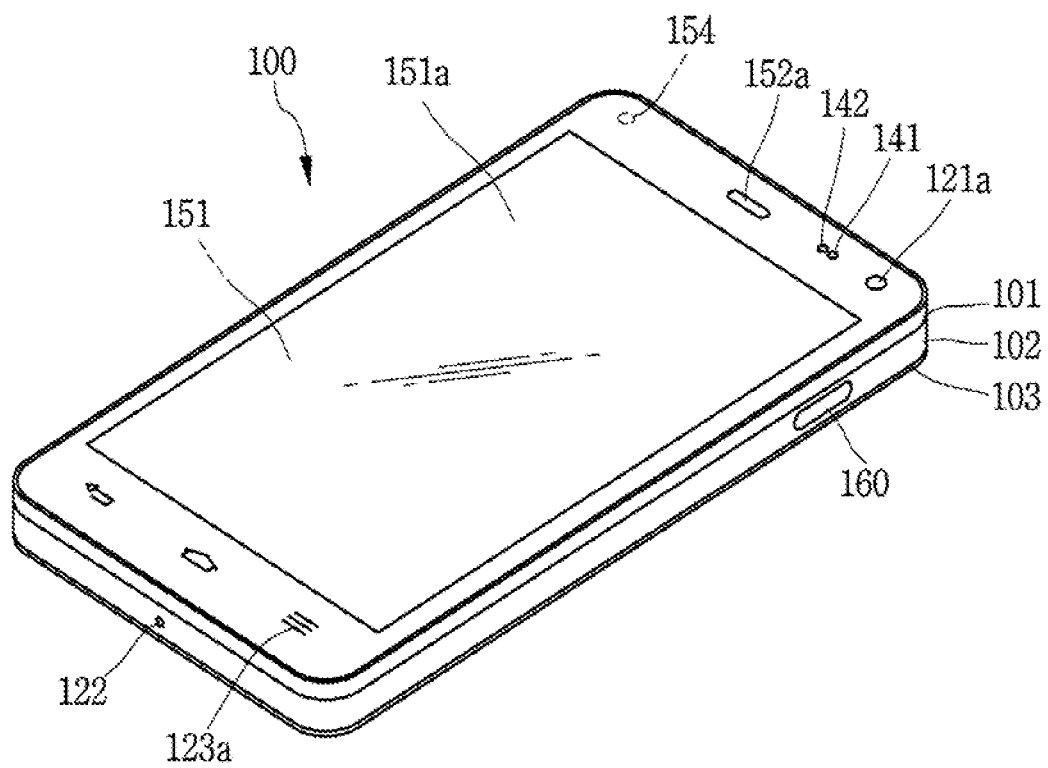

[Figure 5]
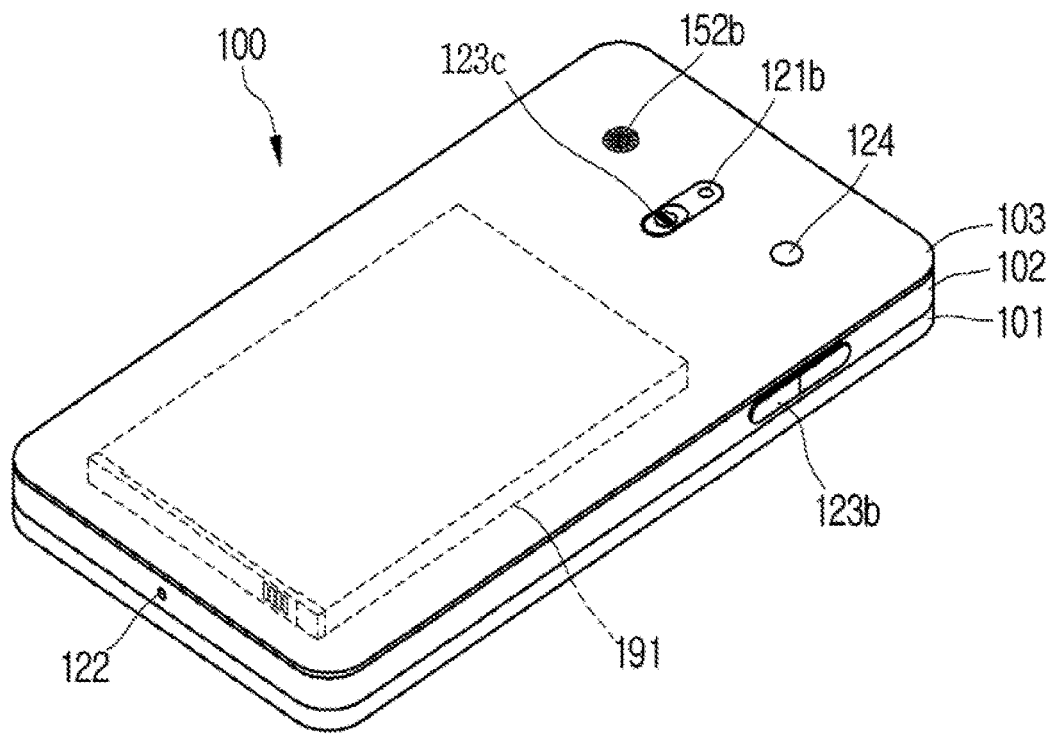

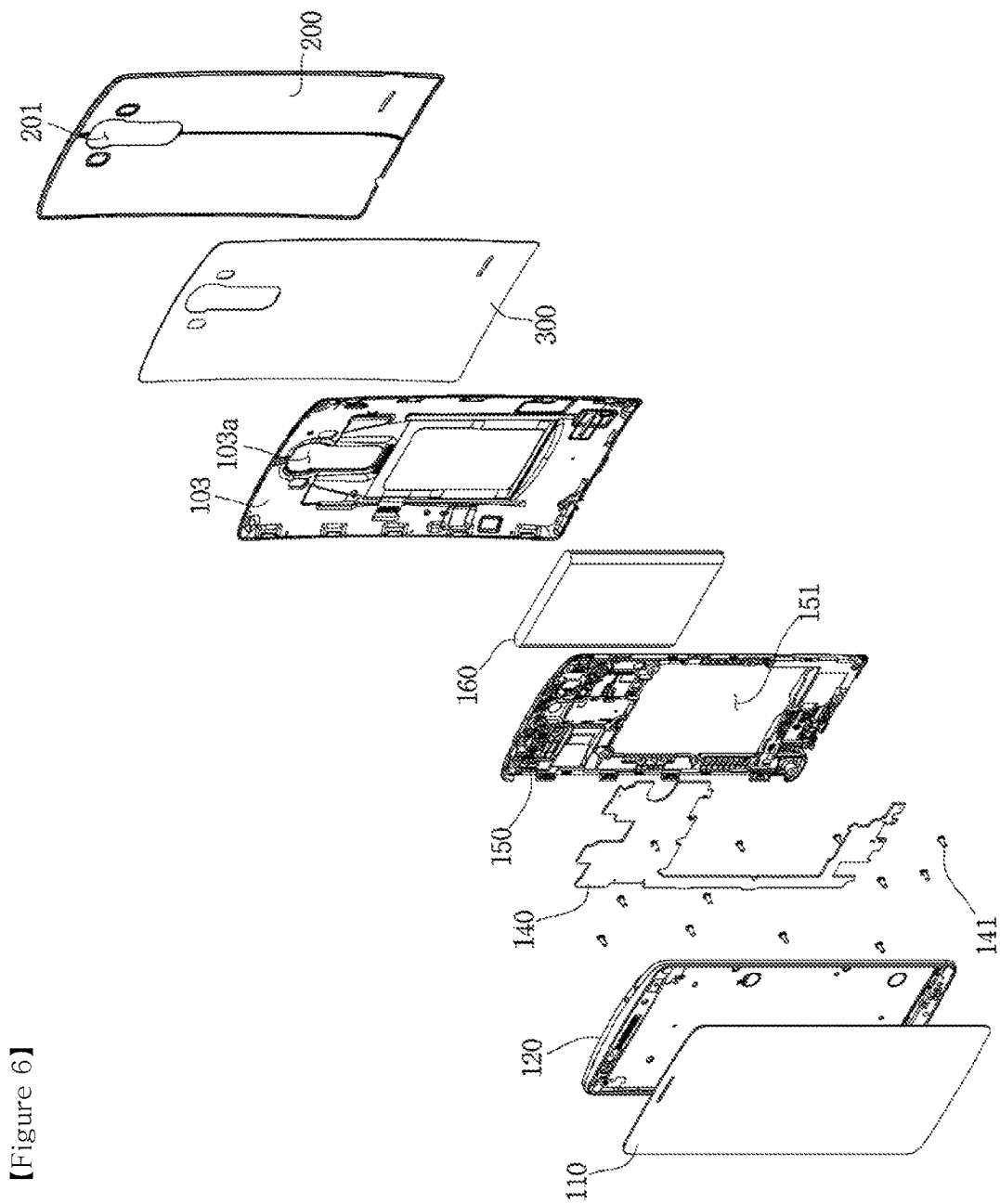
[Figure 6]

[Figure 7]
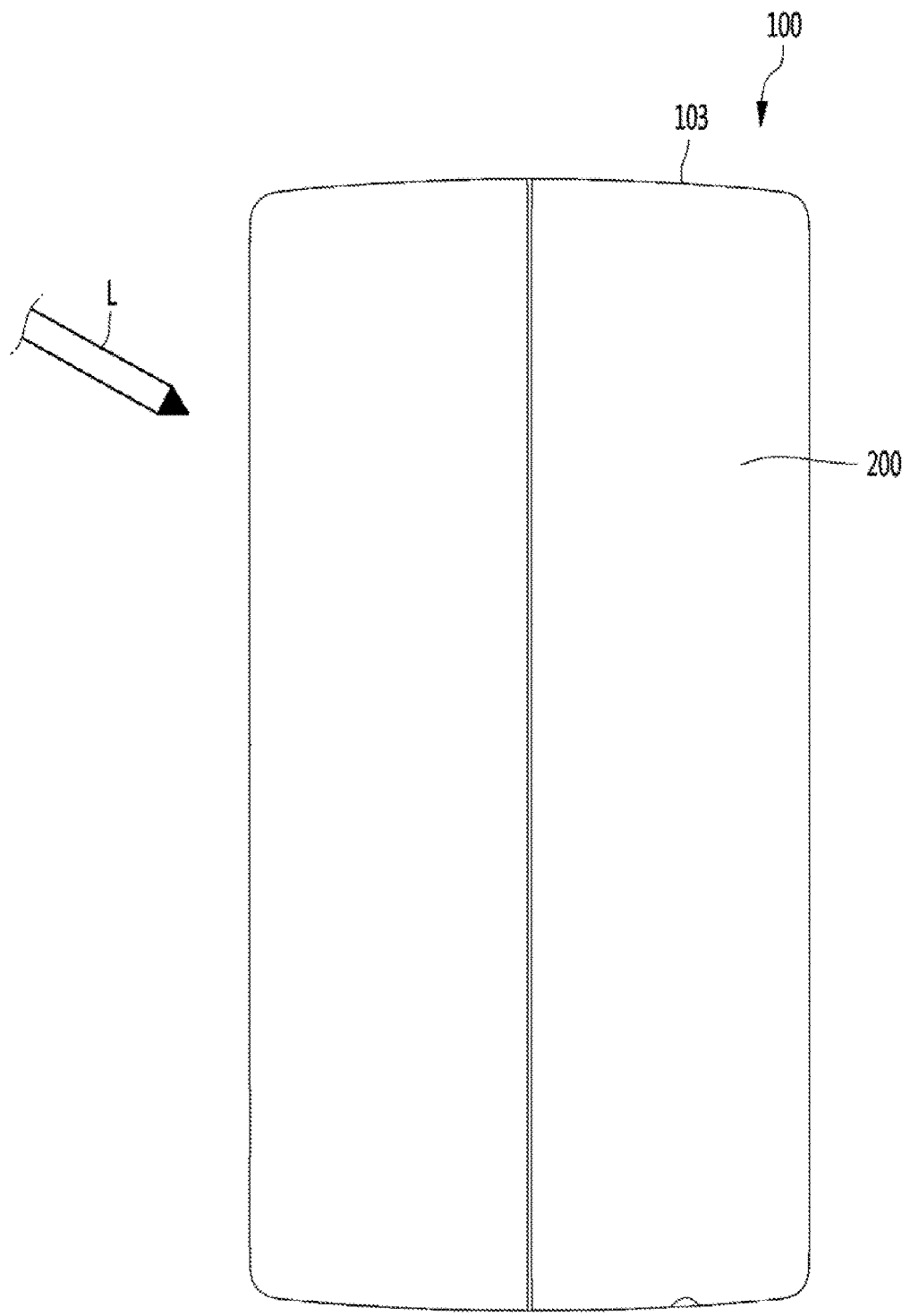

【Figure 8】
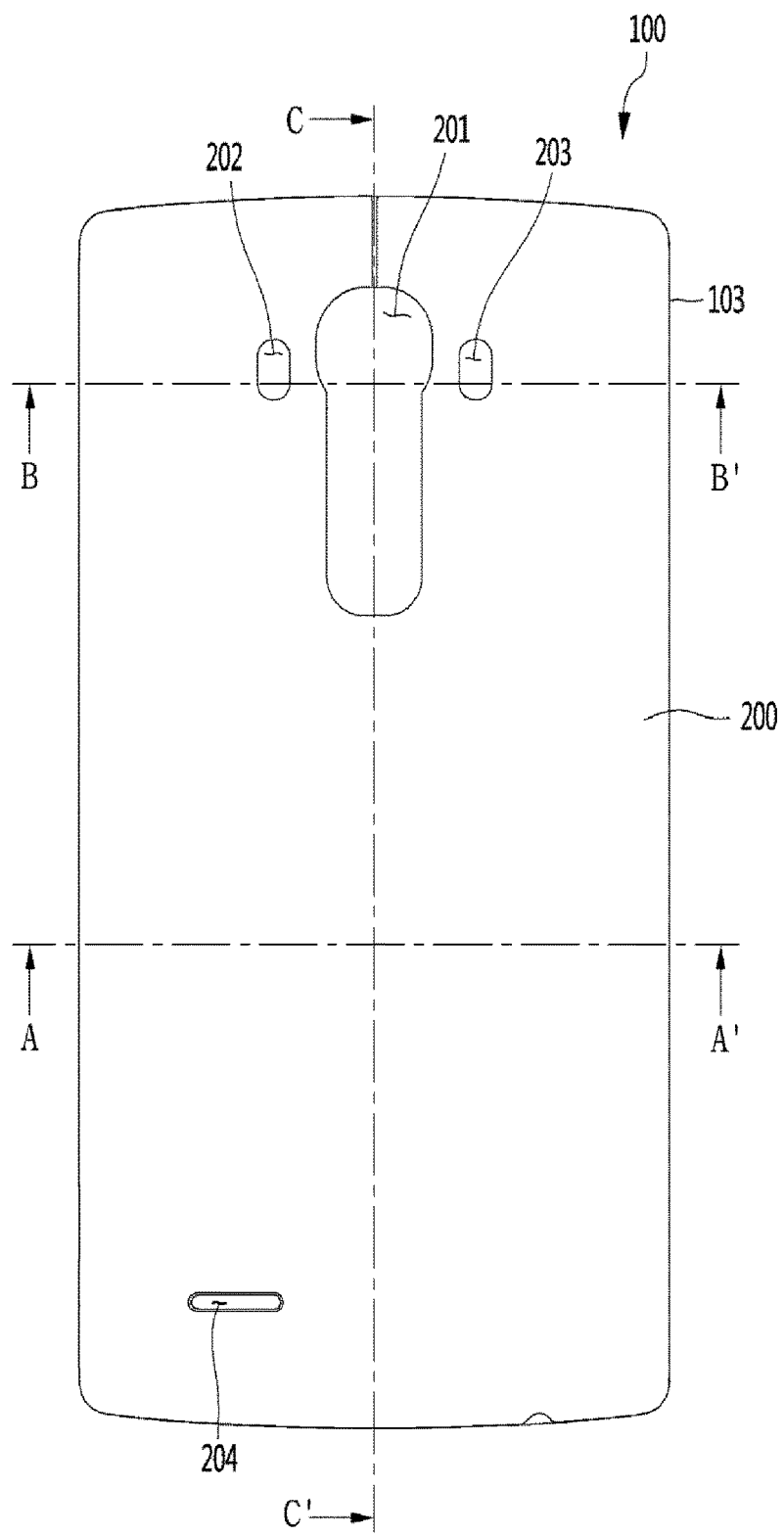

[Figure 9]
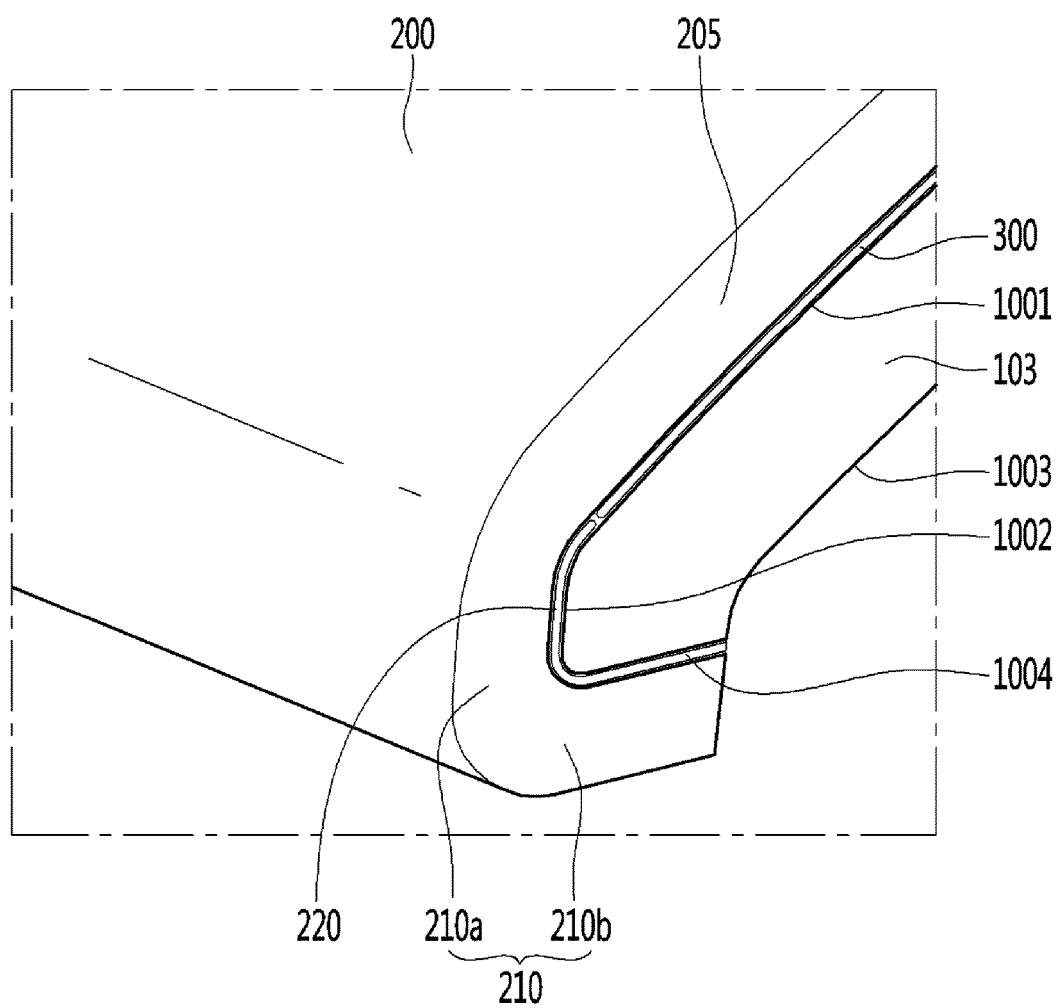

[Figure 10]
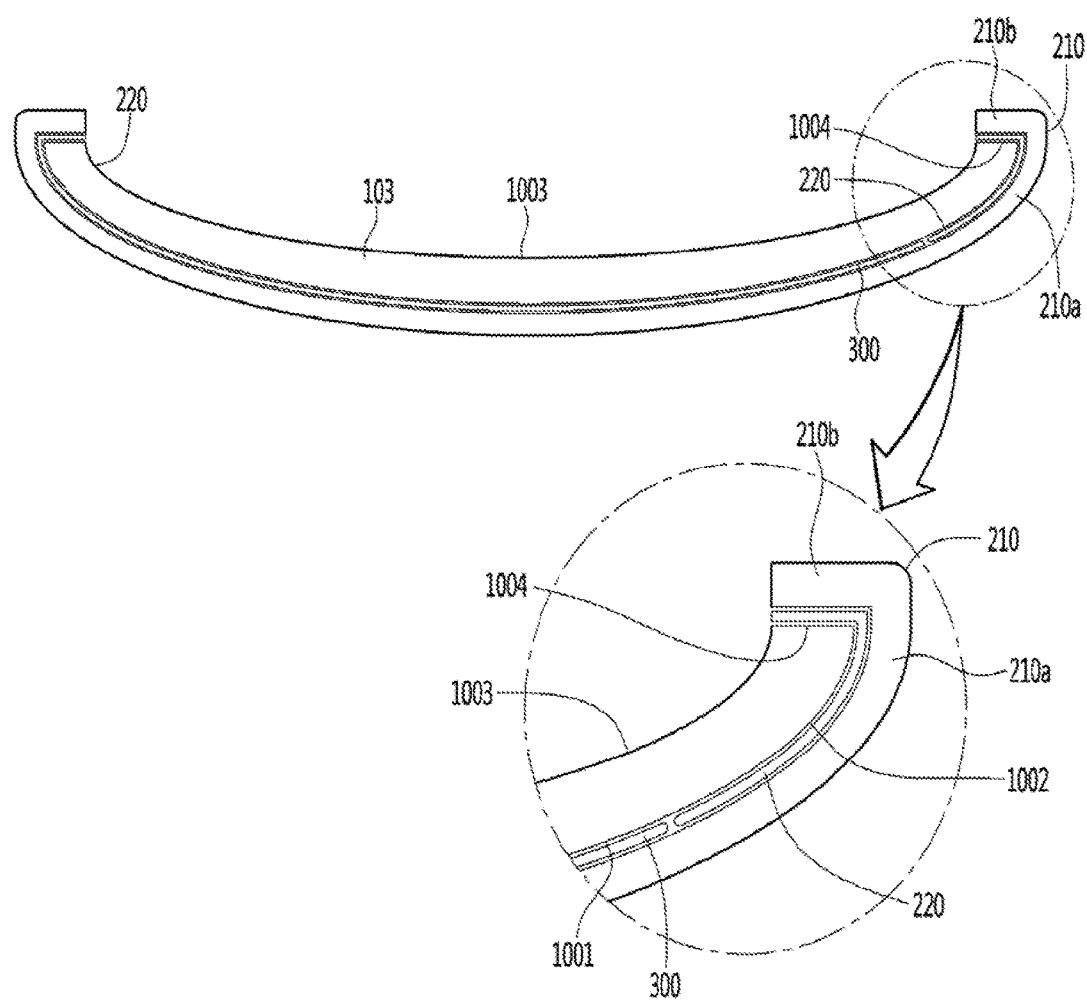

[Figure 11]
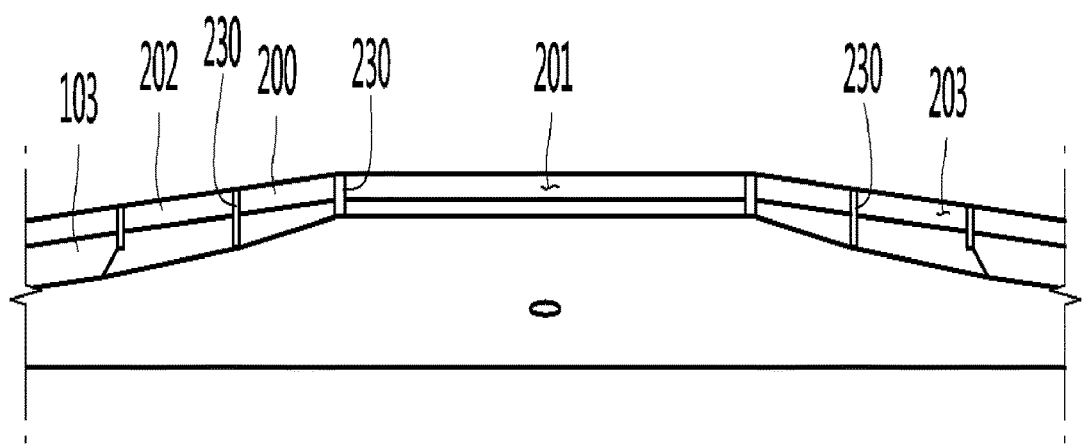

[Figure 12]
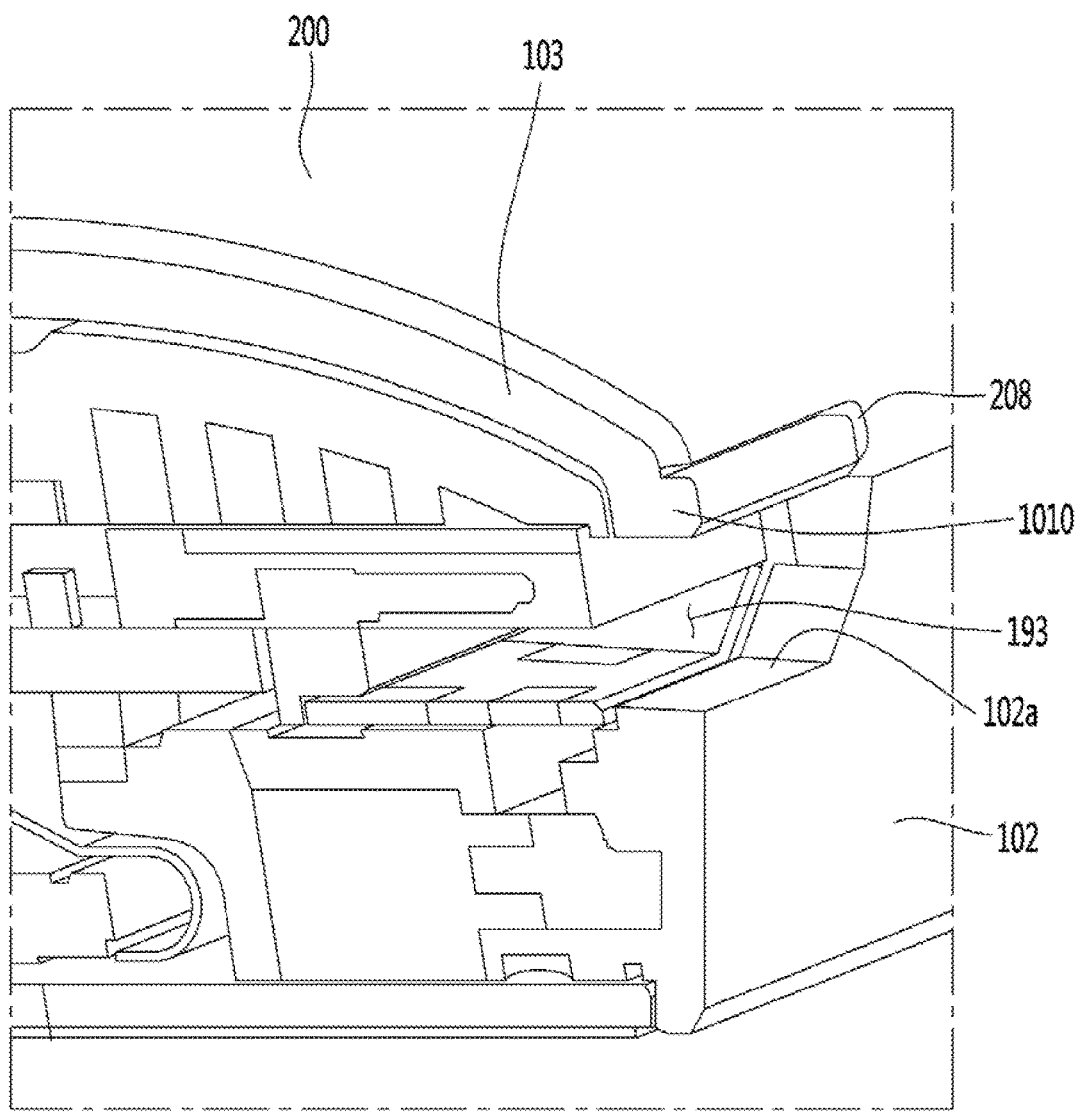

【Figure 13】
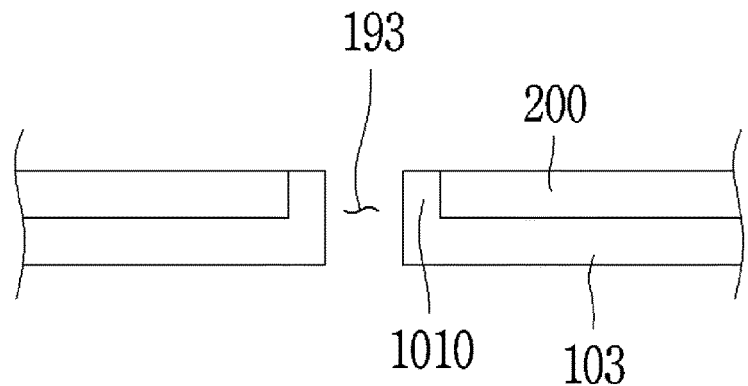
【Figure 14】
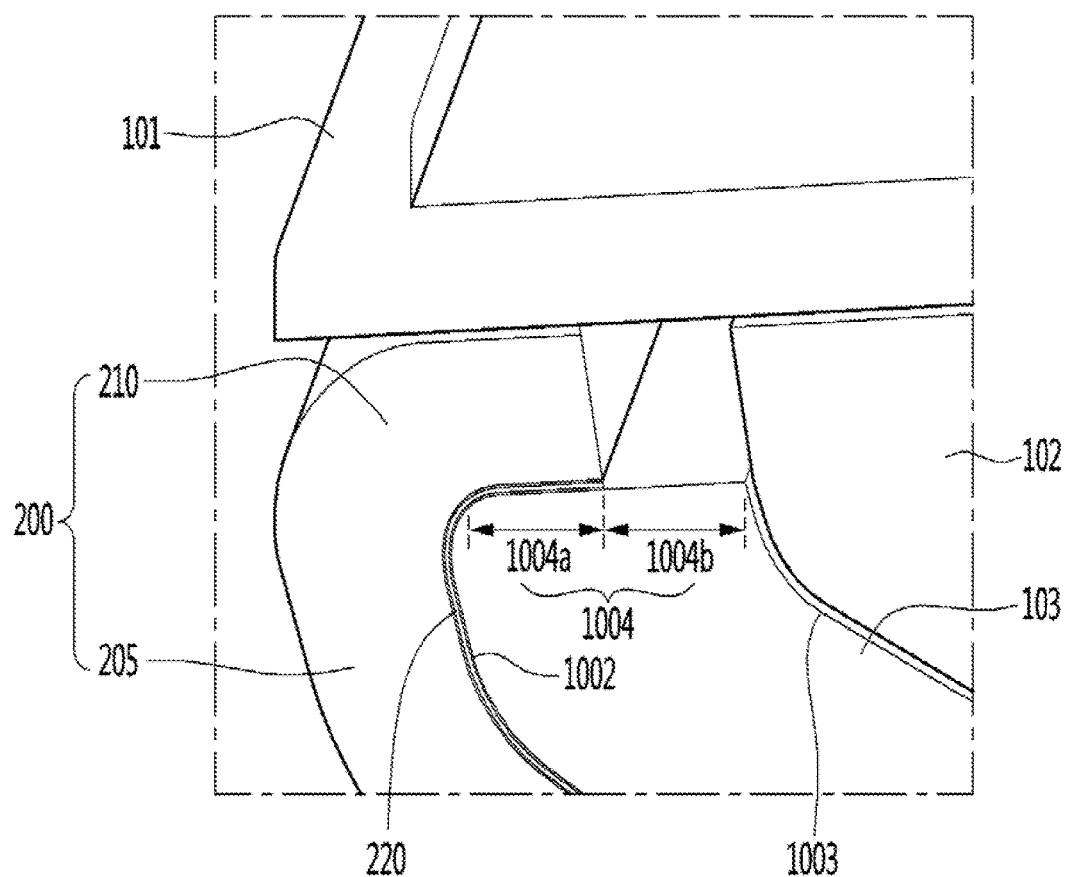

[Figure 15]
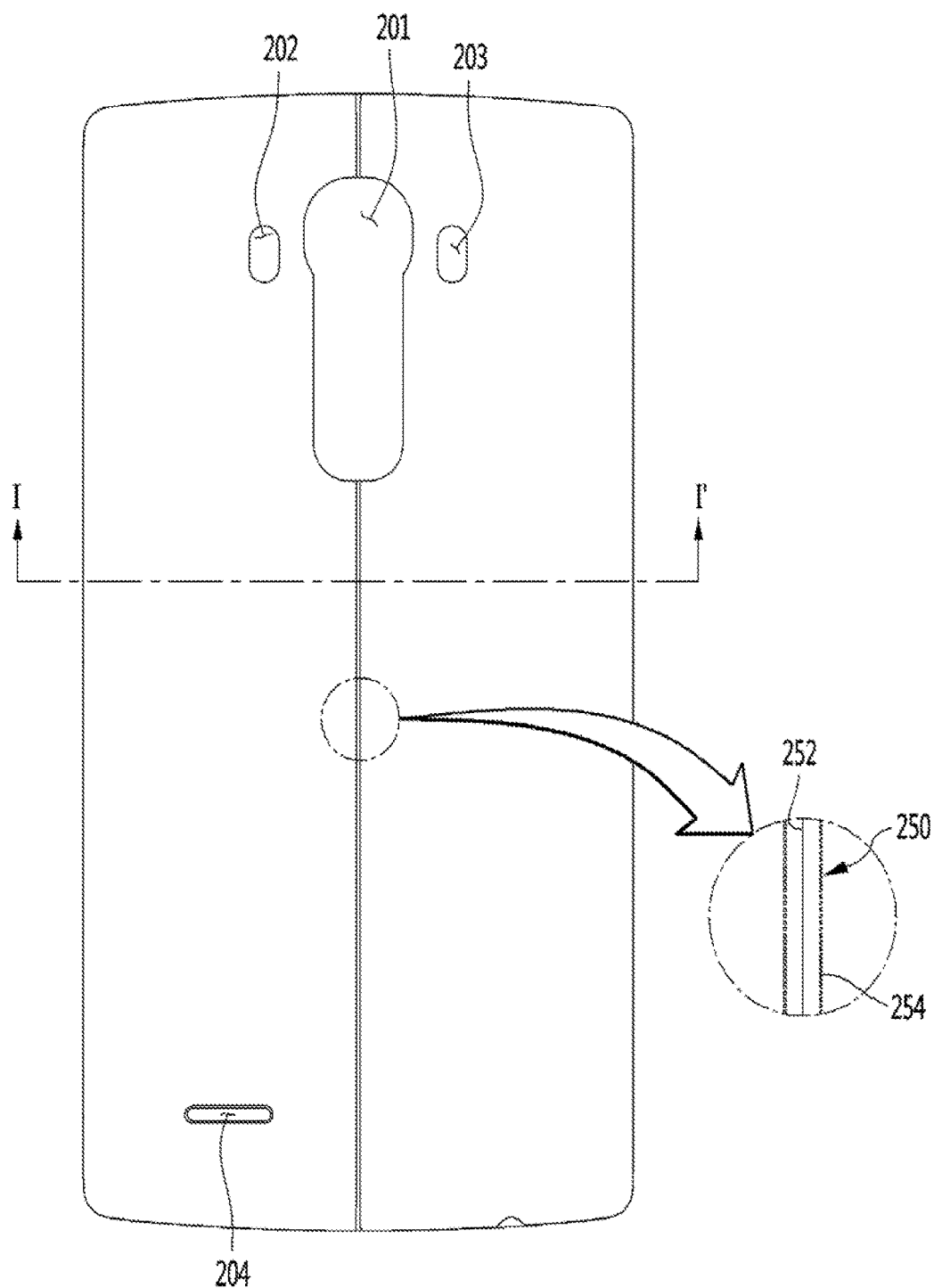

[Figure 16]
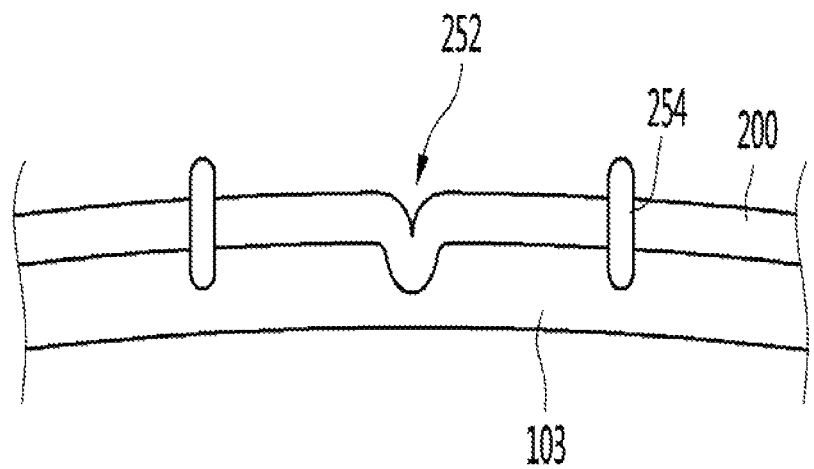

CASE ASSEMBLY FOR MOBILE TERMINAL

CROSS-REFERENCE TO RELATED APPLICATIONS

This application is the National Phase of PCT International Application No. PCT/KR2015/013188, filed on Dec. 4, 2015, which claims priority under 35 U.S.C. 119(a) to Patent Application No. 10-2015-0053265, filed in Republic of Korea on Apr. 15, 2015, all of which are hereby expressly incorporated by reference into the present application.

BACKGROUND

The present invention relates to a case assembly for a mobile terminal.

A terminal may be classified into a mobile terminal (mobile/portable terminal) and a fixed terminal (stationary terminal) according to whether the terminal may move. Further, the mobile terminal may be classified into a portable terminal (handheld terminal) and a holdable terminal (vehicle mounted terminal) according to whether a user may directly carry the mobile terminal.

Functions of the mobile terminal are being diversified. For example, the functions include data and voice communication, picture shooting and video shooting through a camera, voice recording, reproduction of a music file through a speaker system and outputting of an image or a video to a display unit. Some terminals have an added electronic game playing function or perform a multimedia player function. In particular, recent mobile terminals may receive a multi-cast signal providing visual contents such as broadcasting, video and a television program.

As such a terminal has the diversified functions, the terminal is implemented in a form of a multimedia device having complex functions including, for example, shooting of a picture or a video, reproduction of a music file or a video file, a game, reception of broadcasting or the like.

Modification of a structural portion and/or a software portion of the terminal may be considered to support and increase such functions of the terminal.

FIG. 1 is a sectional view illustrating one structure of a rear surface case of a mobile terminal according to the related art, and FIG. 2 is a sectional view illustrating another structure of the rear surface case of the mobile terminal according to the related art.

Referring to FIG. 1, the rear surface case of the mobile terminal according to the related art includes a rear surface case 2 covering a rear surface of the mobile terminal, and a rear cover 5 attached to a rear surface of the rear surface case 2 to protect the rear surface of the rear surface case 2. The rear surface case 2 is attached to cases arranged on a front side of the mobile terminal to cover electronic products arranged inside the mobile terminal, and the rear cover 5 is attached to the rear surface of the rear surface case 2 to prevent the rear surface of the rear surface case 2 from being polluted or absorb an impact applied to the mobile terminal.

The rear cover 5 may be manufactured to have various designs to provide an aesthetic sense to the user. As an example, the rear cover 5 may be formed of leather. As illustrated, the rear cover 5 may include an adhesive part 6 formed on the rear surface of the rear surface case 2 to provide an adhesive force so as to couple the rear cover 5 and the rear surface case 2 to each other, and a surface part 8 formed of leather and attached to an upper surface of the adhesive part 6 to define an outer surface. In some cases, an intermediate part 7 arranged between the surface part 8 and the adhesive part 6 to couple the surface part 8 and the adhesive part 6 to each other may be provided. The intermediate part 7 may be formed of non-woven fabric.

In recent years, a mobile terminal in which a circumferential edge 3 of the rear surface case 2 is rounded about a central plane in consideration of a gripping sense of the user and a design of the mobile terminal has been released. However, when the circumferential edge 3 of the rear surface case 2 is rounded, a separation phenomenon in which the rear cover 3 is separated from the edge of the rear surface case 2 may occur.

Because of this, although it is considered that as illustrated in FIG. 2, a protrusion 4 protruding upwards is formed at the circumference edge of the rear surface case 2, and the edge of the rear cover 3 is inserted between the protrusion 4 and the rounded surface of the rear surface case 2, there is a problem in that because the protrusion 4 is exposed to the outside, the overall appearance of the mobile terminal deteriorates.

SUMMARY

The present invention is conceived to resolve the above-described problems, and an aspect of the present invention is to provide a case assembly having a rear cover coupled to a rear surface of a rear surface case to cover the entire rear surface.

To achieve the above aspect, a case assembly according to an aspect of the present invention may include a rear surface case detachably coupled to a rear surface of a terminal body to cover the rear surface of the terminal body, a rear cover coupled to a rear surface of the rear surface case to protect the rear surface of the rear surface case, and an adhesive sheet provided between the rear surface case and the rear cover to provide an adhesive force to opposite surfaces so as to couple the rear cover to the rear surface of the rear surface case, wherein adhesive parts configured to couple the rear cover and the rear surface case to each other along an edge of the rear surface case are formed in the edge of the rear surface case and an area of the rear cover, which covers the edge of the rear surface case.

The adhesive parts may be urethane coating.

The rear cover may include a body covering the rear surface of the rear surface case, and bent parts which are bent forwards from a circumferential edge of the body, which cover side surfaces of the rear surface case, and portions of which cover front surfaces of the rear surface case, wherein the adhesive parts are located in at least one of an area between the bent parts and the side surfaces of the rear surface case and an area between the bent parts and the front surfaces of the rear surface case.

The rear cover may include a body covering the rear surface of the rear surface case, and bent parts which are bent forwards from a circumferential edge of the body, which cover side surfaces of the rear surface case, and portions of which cover portions of front surfaces of the rear surface case, wherein the adhesive parts are located in at least one of an area between the bent parts and the side surfaces of the rear surface case and an area between the bent parts and the portions of the front surfaces of the rear surface case.

The rear cover may be formed of one or more selected from the group consisting of natural leather, artificial leather, and fabric.

Holes configured to expose, to the outside, one or more selected from the group consisting of a camera, a speaker, a flash, and a manipulation unit provided on the rear surface of the terminal body may be formed in the rear surface case and the rear cover, respectively, and hole coating parts may be formed in the hole of the rear surface case and the hole of the rear cover.

The hole of the rear cover may be formed through laser processing.

The hole coating parts may be urethane coating blocking boundaries between the rear surface case and the rear cover.

A forwards-recessed groove may be formed in the terminal body, a terminal hole defining part defining a terminal hole together with the groove may protrude from the rear surface case, and an avoidance groove avoiding the terminal hole defining part may be formed in the rear cover.

A case assembly according to the present invention may include a rear surface case detachably coupled to a rear surface of a terminal body to cover the rear surface of the terminal body, and a rear cover coupled to a rear surface of the rear surface case to protect the rear surface of the rear surface case, wherein adhesive parts configured to couple the rear cover and the rear surface case to each other along an edge of the rear surface case are formed in an area in which the edge of the rear surface case and an edge of the rear cover face each other.

The adhesive parts may be urethane coating.

A forwards-recessed groove may be formed in the terminal body, a terminal hole defining part defining a terminal hole together with the groove may protrude from the rear surface case, and an avoidance groove avoiding the terminal hole defining part may be formed in the rear cover.

BRIEF DESCRIPTION OF THE DRAWINGS

Embodiments will be described in detail with reference to the following drawings in which like reference numerals refer to like elements, and wherein:

FIG. 1 is a sectional view illustrating one structure of a rear surface case of a mobile terminal according to the related art;

FIG. 2 is a sectional view illustrating another structure of the rear surface case of the mobile terminal according to the related art;

FIG. 3 is a block diagram for explaining a mobile terminal related to the present invention;

FIG. 4 is a perspective view illustrating a front surface of the mobile terminal according to an embodiment of the present invention;

FIG. 5 is a perspective view illustrating a rear surface of the mobile terminal according to the embodiment of the present invention;

FIG. 6 is an exploded perspective view illustrating the mobile terminal according to the embodiment of the present invention;

FIG. 7 is a sectional view illustrating a state in which a hole is formed on a rear cover according to the embodiment of the present invention;

FIG. 8 is a sectional view illustrating a shape of a rear surface of the rear cover in a state in which the rear cover is coupled to a rear surface of a rear surface case;

FIG. 9 is a cutaway perspective view illustrating an example where the rear cover is coupled to the rear surface case according to the embodiment of the present invention;

FIG. 10 is a sectional view taken along line A-A' of FIG. 8;

FIG. 11 is a sectional view taken along line B-B' of FIG. 8;

FIG. 12 is a sectional view taken along line C-C' of FIG. 8;

FIG. 13 is a sectional view illustrating a terminal hole according to the embodiment of the present invention;

FIG. 14 is a cutaway perspective view illustrating another example of the rear cover according to the embodiment of the present invention;

FIG. 15 is a rear view illustrating a rear cover according to another embodiment of the present invention; and FIG. 16 is a sectional view taken along line I-I' of FIG. 15.

DETAILED DESCRIPTION OF THE EMBODIMENTS

Hereinafter, embodiments disclosed in the present specification will be described in detail with reference to the accompanying drawings, the same or similar elements are designated by the same reference number regardless of reference numerals, and duplicate descriptions thereof will be omitted. The suffixes "module" and "unit" for elements used in the following description are assigned or mixedly used in consideration of ease of writing of the specification, and do not have meanings or roles distinguished from each other by itself. Further, in description of the embodiments disclosed in the present specification, when it is determined that the detailed descriptions of the related well-known technologies make the subject matter of the embodiments disclosed in the present specification unclear, the detailed descriptions thereof will be omitted. Further, the accompanying drawings are merely for easily understanding the embodiments disclosed in the present specification, the technical spirit disclosed in the present specification is not limited by the accompanying drawings, and it should be understood that all changes, equivalents and substitutions included in the spirit and the technical scope of the present invention are included.

A mobile terminal described in the present specification may include a cell phone, a smart phone, a laptop computer, a digital broadcasting terminal, a personal digital assistant (PDA), a portable multimedia player (PMP), a navigation, a slate PC, a tablet PC, an ultra-book, a wearable device (for example, a smart watch, a smart glass and a head mounted display (HMD)), and the like.

However, it could be easily understood by those skilled in the art that configurations according to the embodiments disclosed in the present specification may be also applied to a stationary terminal such as a digital TV, a desktop computer and a digital signage, except for a case where the configurations may be applied only to the mobile terminal.

FIG. 3 is a block diagram for explaining a mobile terminal related to the present invention, FIG. 4 is a perspective view illustrating a front surface of the mobile terminal according to an embodiment of the present invention, and FIG. 5 is a perspective view illustrating a rear surface of the mobile terminal according to the embodiment of the present invention.

Referring to FIGS. 3 to 5, a mobile terminal 100 may include a wireless communication unit 110, an input unit 120, a sensing unit 140, an output unit 150, an interface unit 160, a memory 170, a control unit 180, a power supply unit 190, and the like. The components illustrated in FIG. 3 are not essential for implementing the mobile terminal. Thus, the mobile terminal described in the present specification may include more or fewer components than those listed above.

The wireless communication unit 110 may include one or more modules enabling wireless communication between the mobile terminal 100 and a wireless communication system, between the mobile terminal 100 and another mobile terminal, or between the mobile terminal 100 and an external server. Further, the wireless communication unit 110 may include one or more modules connecting the mobile terminal 100 to one or more networks.

The wireless communication unit 110 may include at least one of a broadcast receiving module 111, a mobile communication module 112, a wireless Internet module 113, a short-range communication module 114, and a location information module 115.

The input unit 120 may include a camera 121 or an image input unit configured to input an image signal, a microphone 112 or an audio input unit configured to receive input of an audio signal, a user input unit 123 (for example, a touch key, a push key (mechanical key), and the like) configured to receive input of information from a user. Voice data or image data collected by the input unit 120 may be analyzed and processed through a control command of a user.

The sensing unit 140 may include one or more sensors configured to sense at least one of internal information of the mobile terminal, surrounding environment information of the mobile terminal, and user information. For example, the sensing unit 140 may include at least one of a proximity sensor 141, an illuminance sensor 142, a touch sensor, an acceleration sensor, a magnetic sensor, a gravity sensor, a gyroscope sensor, a motion sensor, an RGB sensor, an infrared sensor, a fingerprint recognition sensor, an ultrasonic sensor, an optical sensor (for example, a camera (see reference numeral 121), a microphone (see reference numeral 122), a battery gauge, an environment sensor (for example, a barometer, a hygrometer, a thermometer, a radiation sensor, a thermal sensor, a gas sensor, and the like), and a chemical sensor (for example, an electronic nose, a health-care sensor, a biometric sensor, and the like). Meanwhile, the mobile terminal disclosed in the present invention may combine and utilize information elements sensed by at least two of the sensors.

The output unit 150, which is adapted to generate an output related to a visual sense, an auditory sense, or a tactile sense, may include at least one of a display unit 151, a sound output unit 152, a haptic module 153, and a light output unit 154. The display unit 151 forms a mutual layer structure together with the touch sensor or is formed integrally with the touch sensor, so that a touch screen may be implemented. Such a touch screen may function as a user input unit 123 configured to provide an input interface between the mobile terminal 100 and the user, and at the same time, may provide an output interface between the mobile terminal 100 and the user.

The interface unit 160 may serve as a passage with various kinds of external devices connected to the mobile terminal 100. Such an interface unit 160 may include at least one of a wired/wireless headset port, an external charger port, a wired/wireless data port, a memory card port, a port for connecting a device having an identification module, an audio input/output (I/O) port, a video input/output (I/O) port, and an earphone port. The mobile terminal 100 may perform a proper control related to connected external devices, in correspondence to the fact that the external devices are connected to the interface unit 160.

Further, the memory 170 stores data configured to support various functions of the mobile terminal 100. The memory 170 may store a plurality of application programs (or applications) driven in the mobile terminal 100, data for operation of the mobile terminal 100, and commands. At least some of the application programs may be downloaded from the external server through the wireless communication. Further, at least some of the application programs may exist on the mobile terminal 100 from the factory for basic functions (for example, a call reception function, a call origination function, a message reception function, and a message transmission function) of the mobile terminal 100. Meanwhile, the application programs may be stored in the memory 170, may be installed in the mobile terminal 100, and thus, may be driven to perform an operation (or a function) of the mobile terminal 100 by the control unit 180.

Generally, the control unit 180 controls the overall operation of the mobile terminal 100 in addition to operations related to the application programs. The control unit 180 may process signals, data, information, and the like input or output through the above-described components or drive the application programs stored in the memory 170, to provide appropriate information or function to the user or process the appropriate information or function.

Further, the control unit 180 may control at least some of the components described in FIG. 3, to drive the application programs stored in the memory 170. Furthermore, the control unit 180 may combine and operate at least two of the components included in the mobile terminal 100, to drive the application programs.

The power supply unit 190 receives external power and internal power to supply electric power to the components included in the mobile terminal 100, under a control of the control unit 180. Such a power supply unit 190 includes a battery, and the battery may be an embedded battery or a replaceable battery.

At least some of the components may be operated in cooperation with each other, to implement an operation, a control or a control method of the mobile terminal 100 according to various embodiments which will be described below. Further, the operation, the control and the control method of the mobile terminal 100 may be implemented on the mobile terminal 100 by driving at least one application program stored in the memory 170.

Referring to FIGS. 4 and 5, the disclosed mobile terminal 100 has a bar-shaped terminal body. However, the present invention is not limited thereto, and may be applied to various structures such as a watch type, a clip type, a glass type, and a folder type, a flip type, a slide type, a swing type, and a swivel type, in which two or more bodies are coupled to each other to be relatively movable. Those related to a specific type of the mobile terminal or descriptions related to the specific type of the mobile terminal may be generally applied to other types of mobile terminals.

Here, the terminal body may be understood as a concept referring to at least one assembly when the mobile terminal 100 is considered as the at least one assembly.

The mobile terminal 100 includes a case (for example, a frame, a housing, a cover, and the like) defining an outer appearance. As illustrated, the mobile terminal 100 may include a front case 101 and a rear case 102. Various kinds of electronic components are arranged inside an internal space formed by coupling the front case 101 and the rear case 102. At least one middle case may be additionally arranged between the front case 101 and the rear case 102. Hereinafter, for convenience of description, an assembly formed by coupling the front case 101 and the rear case 102 is defined as the terminal body.

The display unit 151 may be arranged on a front surface of the terminal body to output information. A window 151*a* of the display unit 151 may be mounted on the front case 101 to define the front surface of the terminal body together with the front case 101.

In some cases, the electronic components may be mounted on the rear case 102. Examples of the electronic components that may be mounted on the rear case 102 include a detachable battery, an identification module, a memory card, and the like. In this case, a rear surface case 103 configured to cover the mounted electronic components may be detachably coupled to the rear case 102. Thus, when the rear surface case 103 is separated from the rear case 102, the electronic components mounted on the rear case 102 are exposed to the outside. In other words, the rear surface case 103 is detachably coupled to a rear surface of the terminal body, which is formed by coupling the front case 101 and the rear case 102, to cover the rear surface of the terminal body.

As illustrated, when the rear surface case 103 is coupled to the rear case 102, portions of side surfaces of the rear case 102 may be exposed. In some cases, when the rear surface case 103 is coupled, the rear case 102 may be completely covered by the rear surface case 103. Meanwhile, an opening configured to expose a camera 121b or a sound output unit 152b to the outside may be provided in the rear surface case 103.

Such cases 101, 102, and 103 may be formed by injecting synthetic resin or may be formed of metal, for example, stainless steel (STS), aluminum (Al), titanium (Ti), or the like.

Dissimilar to the above example where the internal space accommodating various kinds of electronic elements is defined by a plurality of cases, the mobile terminal 100 may be formed such that the internal space is defined by one case. In this case, the mobile terminal 100 having a unibody in which synthetic resin or metal extends from side surfaces to a rear surface thereof may be implemented.

Meanwhile, the mobile terminal 100 may include a waterproof unit (not illustrated) configured to prevent water from being permeated into the terminal body. For example, the waterproof unit may include a waterproof member provided between the window 151a and the front case 101, between the front case 101 and the rear case 102, or between the rear case 102 and the rear surface case 103, to seal the internal space when they are coupled to each other.

The mobile terminal 100 may include the display unit 151, first and second sound output units 152a and 152b, the proximity sensor 141, the illuminance sensor 142, the light output unit 154, first and second cameras 121a and 121b, first to third manipulation units 123a, 123b, and 123c, the microphone 122, the interface unit 160, and the like.

Hereinafter, as illustrated in FIGS. 4 and 5, the mobile terminal 100, in which the display unit 151, the sound output unit 152a, the proximity sensor 141, the illuminance sensor 142, the light output unit 154, the first camera 121a and the first manipulation unit 123a are arranged on the front surface of the terminal body, the second manipulation unit 123b, the microphone 122, and the interface unit 160 are arranged on a side surface of the terminal body, and the second sound output unit 152b, the second camera 121b, the third manipulation unit 123c, and a flash 124 are arranged on the rear surface of the terminal body, is described as an example.

However, these components are not limited to such arrangement. These components may be excluded or substituted as needed, or may be arranged on other surfaces. For example, the first manipulation unit 123a may not be provided on the front surface of the terminal body, and the second sound output unit 152b may be provided not on the rear surface of the terminal body but on the side surface of the terminal body.

The display unit 151 displays (outputs) information processed by the mobile terminal 100. For example, the display unit 151 may display information on an execution screen of an application program driven by the mobile terminal 100 or information on a user interface (UI) and a graphic user interface (GUI) according to the information on the execution screen.

The display unit 151 may include at least one of a liquid crystal display (LCD), a thin-film transistor-liquid crystal display (TFT LCD), an organic light emitting diode (OLED), a flexible display, a three-dimensional (3D) display and an electronic-ink display.

Further, two or more display units 151 may exist depending on an implementation form of the mobile terminal 100. In this case, the plurality of display units may be arranged on one surface of the mobile terminal 100 to be spaced apart from each other or to be formed integrally with each other, or may be arranged on different surfaces of the mobile terminal 100.

The display unit 151 may include a touch sensor configured to detect a touch on the display unit 151 to receive input of a control command through a touch scheme. Using the same, when a touch is made on the display unit 151, the touch sensor detects the touch, and the control unit 180 generates a control command corresponding to the touch based on the same. The contents input through the touch scheme may be a letter, a number, a menu item that may be indicated or designated in various modes, or the like.

Meanwhile, the touch sensor is formed in a film form having a touch pattern to be arranged between the window 151a and a display (not illustrated) on a rear surface of the window 151a or may be a metal wire directly patterned on the rear surface of the window 151a. Further, the touch sensor may be formed integrally with the display. For example, the touch sensor may be arranged on a substrate of the display or may be provided inside the display.

In this way, the display unit 151 may define a touch screen together with the touch sensor, in which case the touch screen may function as a user input unit 123 (see FIG. 3). In some cases, the touch screen may substitute at least some functions of the first manipulation unit 123a.

The first sound output unit 152a may be implemented in a receiver configured to transfer a call sound to ears of the user, and the second sound output unit 152b may be implemented in a loud speaker configured to output various alarm sounds or reproduction sounds of multimedia.

Sound holes configured to discharge sound generated by the first sound output unit 152a may be formed in the window 151a of the display unit 151. However, the present invention is not limited thereto, and the sound may be discharged along an assembly gap between structures (for example, a gap between the window 151a and the front case 101). In this case, holes independently formed to output the sound are not seen or are hidden due to an outer appearance, so that the outer appearance of the mobile terminal 100 may be further simplified.

The light output unit 154 is configured to output light for notifying of an event when the event occurs. Examples of the event may include reception of a message, reception of a call signal, an unanswered call, an alarm, notification of a schedule, reception of an E-mail, reception of information through an application, and the like. The control unit 180 may control the light output unit 154 to terminate the output of the light when it is detected that the user identifies the event.

The first camera 121a processes an image frame of a still image or a moving image obtained by an image sensor in a shooting mode or a video call mode. The processed image frame may be displayed on the display unit 151 and may be stored in the memory 170.

The first and second manipulation units 123a and 123b, as an example of the user input unit 123 manipulated to receive input of a command for controlling an operation of the mobile terminal 100, may be also commonly called a manipulation unit. The first and second manipulation units 123a and 123b may employ any scheme that corresponds to a scheme in which the user performs manipulation while receiving a tactile sense such as a touch, a push, and a scroll. Further, the first and second manipulation units 123a and 123b may also employ a scheme in which the user performs manipulation without a tactile sense through a proximity touch, a hovering touch, or the like.

In the present embodiment, the first manipulation unit 123a is exemplified as a touch key, but the present invention is not limited thereto. For example, the first manipulation unit 123a may be a push key (mechanical key) or a combination of the touch key or the push key.

Contents input by the first and second manipulation units 123a and 123b may be variously configured. For example, the first manipulation unit 123a may receive input of commands such as a menu, a home key, cancellation, and searching, and the second manipulation unit 123b may receive input of commands such as adjusting of the size of the sound output by the first or second sound output unit 152a and 152b and switching of the display unit 151 to a touch recognition mode.

Meanwhile, a third manipulation unit 123c as another example of the user input unit 123 may be provided on a rear surface of the terminal body. Such a third manipulation unit 123c is manipulated to receive input of a command for controlling an operation of the mobile terminal 100, and input contents may be variously set. For example, the third manipulation unit 123c may receive input of commands such as an ON/OFF operation of a power source, start, termination, and scrolling and commands such as adjusting of the size of the sound output by the first and second sound output units 152a and 152b and switching of the display unit 151 to a touch recognition mode. The third manipulation unit 123c may be implemented in a form in which a touch input, a push input and an input by a combination thereof may be performed.

The third manipulation unit 123c may be arranged to overlap the display unit 151 on the front surface of the terminal body in a thickness direction of the terminal body. As an example, the third manipulation unit 123c may be arranged at a upper end of a rear surface of the terminal body such that the user may easily manipulate the terminal body using an index finger when holding the terminal body by one hand. However, the present invention is not necessarily limited thereto, and a location of the third manipulation unit 123c may be changed.

In this way, when the third manipulation unit 123c is provided on the rear surface of the terminal body, a new type of user interface may be implemented using the same. Further, the above-described touch screen or a rear surface input unit is substituted for at least some functions of the first manipulation unit 123a provided on the front surface of the terminal body. Thus, when the first manipulation unit 123a is not arranged on the front surface of the terminal body, the display unit 151 may be configured in a larger screen.

Meanwhile, the mobile terminal 100 may have the fingerprint recognition sensor configured to recognize a fingerprint of the user, and the control unit 180 may utilize fingerprint information detected through the fingerprint recognition sensor as an authentication means. The fingerprint recognition sensor may be embedded in the display unit 151 or the user input unit 123.

The microphone 122 is configured to receive input of voice of the user, and other sounds. The microphones 122 may be provided at a plurality of positions to receive a stereo sound.

The interface unit 160 may be a passage through which the mobile terminal 100 may be connected to an external device. For example, the interface unit 160 may be at least one of a connection port for connection with other devices (for example, an earphone, and an external speaker), a port (for example, an infrared port (IrDA port), a Bluetooth port, a wireless Local Area Network (LAN) port, or the like) for short-range communication, and a power supply port for supplying electric power to the mobile terminal 100. Such an interface unit 160 may be also implemented in a form of a socket accommodating a subscriber identification module (SIM) or a user identity module (UIM), or an external card such as a memory card for storing information.

The second camera 121b may be arranged on the rear surface of the terminal body. In this case, the second camera 121b has a shooting direction that is substantially opposite to the first camera 121a.

The second camera 121b may include a plurality of lenses arranged along at least one line. The plurality of lenses may be arranged in a matrix form. Such a camera may be named an array camera. When the second camera 121b is an array camera, an image may be shot in various schemes using the plurality of lenses, and an image having a better quality may be acquired.

The flash 124 may be arranged to be adjacent to the second camera 121b. The flash 124 irradiates light toward a subject when the subject is photographed by the second camera 121b.

The second sound output unit 152b may be additionally arranged in the terminal body. The second sound output unit 152b may implement a stereo function together with the first sound output unit 152a, and may also be used to implement a speakerphone mode during calling.

At least one antenna for wireless communication may be provided in the terminal body. The antenna may be embedded in the terminal body or may be formed in the case. For example, the antenna constituting a portion of the broadcast receiving module 111 (see FIG. 3) may be withdrawn from the terminal body. Otherwise, the antenna may be formed in a film type and may be attached to an inner surface of the rear surface case 103, or a case including a conductive material may function as the antenna.

The power supply unit 190 (see FIG. 3) configured to supply electric power to the mobile terminal 100 is provided in the terminal body. The power supply unit 190 may include a battery 190 that is embedded in the terminal body or is detachably provided outside the terminal body.

The battery 190 may receive electric power through a power cable connected to the interface unit 160. Further, the battery 190 may be wirelessly charged through a wireless charging device. The wireless charging may be implemented by a magnetic induction scheme or a resonance scheme (magnetic resonance scheme).

Meanwhile, a state in which the rear surface case 103 is coupled to the rear case 102 to cover the battery 190, so as to restrain separation of the battery 190 and protect the battery 190 from an external impact and foreign substances is exemplified in the present drawing. When the battery 190 is detachably provided in the terminal body, the rear surface case 103 may be detachably coupled to the rear case 102.

An accessory configured to protect the outer appearance or assist or extend functions of the mobile terminal 100 may be added to the mobile terminal 100. An example of the accessory may be a cover or a pouch configured to cover or accommodate at least one surface of the mobile terminal 100. The cover or the pouch may extend the functions of the mobile terminal 100 in conjunction with the display unit 151. Another example of the accessory may be a touch pen configured to assist or extend a touch input on the touch screen.

Hereinafter, configurations of a rear cover 200 configured to protect a rear surface of the outer appearance of the mobile terminal 100 will be described.

FIG. 6 is an exploded perspective view illustrating the mobile terminal according to the embodiment of the present invention, FIG. 7 is a sectional view illustrating a state in which a hole is formed on a rear cover according to the embodiment of the present invention, and FIG. 8 is a sectional view illustrating a shape of a rear surface of the rear cover in a state in which the rear cover is coupled to a rear surface of a rear surface case.

Referring to FIG. 6, the mobile terminal 100 may include the display unit 151 arranged on the front surface thereof, the front case 101 to which the display unit 151 is mounted, the rear case 102 in which a battery accommodating hole 191 that may accommodate the battery 190 is formed, a substrate unit 185 which is arranged between the front case 101 and the rear case 102 and on which electronic components required for driving the mobile terminal 100 are mounted, the rear surface case 103 detachably coupled to the rear surface of the rear case 102 and configured to cover the electronic components mounted inside the mobile terminal 100, and the rear cover 200 coupled to a rear surface of the rear surface case 103 to protect the rear surface of the rear surface case 103.

In the mobile terminal 100, components except for the rear surface case 103 and the rear cover 200 may constitute the terminal body, and the rear surface case 103 may be detachably coupled to the rear surface of such a terminal body to cover the rear surface of the terminal body. Further, the rear cover 200 may protect the rear surface case 103 while being integrally coupled to the rear surface case 103. The rear cover 200 may define an outer appearance of the rear surface of the mobile terminal 100 in a state in which the rear cover 200 is integrally located on a rear side of the rear surface case 103.

Although a hole 103a configured to expose the third manipulation unit 123c to the outside is formed in the rear surface case 103 illustrated in FIG. 6, a hole configured to expose the second camera 121b, the second sound output unit 152b, the flash 124, and the third manipulation unit 123c to the outside of the rear surface case 103 may be formed in the rear surface case 103.

The front case 101 and the rear case 102 may be screw-coupled to each other through screws 131. Further, the rear surface case 103 is detachably coupled to the rear case 102, so that the user may replace the battery 190 by separating the rear surface case 103 from the rear case 102.

Meanwhile, the rear cover 200 is provided on the rear surface of the rear surface case 103 to protect the rear surface of the rear surface case 103. The rear cover 200 may be formed to correspond to the shape of the rear surface case 103, and may be coupled to the rear cover 200 to surround the rear surface and side surfaces of the rear cover 200. In this way, the rear cover 200 covers the rear surface of the mobile terminal 100 to prevent the mobile terminal 100 from being damaged or scratched, and protects the electronic components arranged inside the mobile terminal 100 from an impact.

The rear cover 200 may be formed of a material, such as natural leather, artificial leather, and fabric, which is soft and thus is freely deformed. Otherwise, the inner surface and the outer surface of the rear cover 200 are formed of different materials. In this case, the inner surface may be formed of a soft material such that the rear cover 200 is easily attached to the rear surface of the rear surface case 103, and the outer surface may be formed of leather. At this time, a support defining a frame to maintain an outer shape of the rear cover 200 may be provided between the inner surface and the outer surface of the rear cover 200.

Further, an adhesive sheet 300 may be arranged between the rear cover 200 and the rear surface case 103, to couple the rear cover 200 to the rear surface of the rear surface case 103. As an example, the adhesive sheet 300 may be a tape, opposite surfaces of which are applied with adhesive. The adhesive sheet 300 is formed to correspond to sectional shapes of the rear cover 200 and the rear surface case 103, so as to provide an adhesive force between the rear cover 200 and the rear surface case 103.

Meanwhile, as described above, holes configured to expose the second camera 121b, the second sound output unit 152b, the flash 123 and the third manipulation unit 123c to the outside are formed in the rear cover 200 and the rear surface case 103. Hereinafter, a process of forming a hole will be described.

As illustrated in FIG. 7, in a state in which the holes are not formed, the rear cover 200 may be coupled to the rear surface case 103 through the adhesive sheet 300. In a state in which the rear cover 200 is coupled to the rear surface of the rear surface case 103 through the adhesive sheet 300, a laser generating device L may laser-process (cut) areas of the rear cover 200, which correspond to the second camera 121b, the second sound output unit 152b, the flash 123, and the third manipulation unit 123c, respectively. The rear cover 200 may be cut to correspond to the hole 103a of the rear surface case 103 through the laser generating device L, and as illustrated in FIG. 8, a hole, which is like the hole 103a of the rear surface case 103, may be also formed in the rear cover 200.

In the related art, after the holes are penetrated in the rear cover 200 and the rear surface case 103, the positions of the holes are adjusted while the rear cover 200 is coupled to the rear surface case 103. However, in this case, there is a problem in that because the holes are not accurately positioned, coupling precision deteriorates. Further, there is a disadvantage in that because the holes are aligned through a handwork or separate equipment, work efficiency is not excellent.

However, in the process of forming a hole according to the present embodiment, there is an advantage in that because the holes may be processed through the laser generating device L, position deviation between the holes of the rear cover 200 and the rear surface case 103 may be minimized, and precision may be improved. Further, there is an advantage in that fine processing of the holes may be performed through the laser generating device L, and production efficiency of a product may be maximized.

Hereinafter, a coupling structure of the rear cover 200 and the rear surface case 103 will be described.

FIG. 9 is a cutaway perspective view illustrating an example where the rear cover is coupled to the rear surface case according to the embodiment of the present invention, FIG. 10 is a sectional view taken along line A-A' of FIG. 8, and FIG. 11 is a sectional view taken along line B-B' of FIG. 8.

Referring to FIGS. 9 to 11, opposite sides of the rear surface case 103 are curved forwards, and thus, the rear surface case 103 may be formed to have an overall rounded shape. Further, the rear cover 200 is formed to correspond to the shape of the rear surface case 103 to cover the entire rear surface of the rear surface case 103.

The rear surface case 103 may be rounded from a rear surface 1001 toward side surfaces 1002, and an inner surface 1003 may be formed to have a recessed shape. The rear surface case 103 may include front surfaces 1004 connecting the side surfaces 1002 and the recessed inner surface 1003. The front surfaces 1004 of the rear surface case 103 may be inclined at a predetermined angle. The front surfaces of the rear surface case 103 may extend along edges of the rear surface case 103.

The rear cover 200 may include a body 205 covering the rear surface 1001 of the rear surface case 103. The body 205 may be coupled to the rear surface 1001 of the rear surface case 103. The body 205 may be attached and coupled to the rear surface 1001 of the rear surface case 103 through the adhesive sheet 300.

The rear cover 200 may further include bent parts 210 bent forwards from circumferential edges of the body 205 to cover the side surfaces 1002 of the rear surface case 103. The rear cover 200 may cover the rear surface 1001 and the side surfaces 1002 of the rear surface case 103 together. Portions of the bent parts 210 may cover the front surfaces 1004 of the rear surface case 103. The rear cover 200 may cover all the rear surface 1001, the side surfaces 1002, and the front surfaces 1004 of the rear surface case 103.

Each of the bent parts 210 may include a side cover part 210a bent from the body 205 to cover the corresponding side surface 1002 of the rear surface case 103, and a front cover part 210b bent from the side cover part 210a to cover the corresponding front surface 1004 of the rear surface case 103, and the bent parts 210 may be arranged to surround the edges of the rear surface case 103.

The rear cover 200 may be formed of one or more selected from the group consisting of natural leather, artificial leather and fabric. The rear cover 200 may be formed of a material, such as natural leather, artificial leather, and fabric, which is soft and thus is freely deformed. The inner surface and the outer surface of the rear cover 200 are formed of different materials. In this case, the inner surface may be formed of a soft material such that the rear cover 200 is easily attached to the rear surface of the rear surface case 103, and the outer surface may be formed of leather. At this time, the rear cover 200 may further include a support (not illustrated) defining a frame between a portion defining the inner surface thereof and a portion defining the outer surface thereof, the frame maintaining an outer shape of the rear cover 200.

As described above, the rear cover 200 and the rear surface case 103 may be coupled to each other through the adhesive sheet 300. Further, adhesive parts 220 configured to couple circumferential edges of the rear cover 200 and circumferential edges of the rear surface case 103 to each other may be formed at edges of the rear cover 200 and the rear surface case 103.

The adhesive parts 220 may be formed between the side surfaces 1002 of the rear surface case 103 and the bent parts 210. The adhesive parts 220 may be formed between the front surfaces 1004 of the rear surface case 103 and the bent parts 210. The adhesive parts 220 may be formed in at least one of a first area between the side surfaces 1002 of the rear surface case 103 and the bent parts 210 and a second area between the front surfaces 1004 of the rear surface case 103 and the bent parts 210.

The adhesive parts 220 may extend along areas in which edges of the rear surface case 103 and edges of the rear cover 200 face each other.

In detail, the adhesive parts 220 may extend from the rear surface 1001 of the rear surface case 103 to the side surfaces 1002 of the rear surface case 103. The adhesive parts 220 may extend from the rear surface 1001 of the rear surface case 103 to the front surfaces 1002 of the rear surface case 103.

Areas of the rear cover 200, in which the adhesive parts 220 are formed, may be inner surfaces of the bent parts 210, that is, surfaces of the bent parts 210, which face the outer surface of the rear surface case 103. The circumferential edges of the rear cover 200 and the circumferential edges of the rear surface case 103 may be firmly coupled to each other, and the bent parts 210 may be closely fixed to the rear surface case 103 without separation.

The adhesive parts 220 may be adhesive, for example, urethane coating. Urethane, which is resin providing an adhesive force, is a thermosetting material. When the adhesive parts 220 are formed of urethane, there is an advantage in that the edges of the rear cover 200 may be firmly coupled to the rear surface case 103 only through contact pressure. Further, there is an advantage in that because the shapes of the adhesive parts 220 are maintained even while the mobile terminal is used, adhered areas 220 may be continuously preserved.

Because a separation phenomenon in which the edges of the rear cover 200 are uncoupled may occur due to the coupling between the rear cover 200 and the rear surface case 103, in the present embodiment, the adhesive parts 220 formed of urethane are formed at the edges of the rear cover 200 and the edges of the rear surface case 103, so that a separation phenomenon may be prevented from occurring at the edges of the rear cover 200.

FIG. 11 is a sectional view taken along line B-B' of FIG. 8.

The holes configured to expose, to the outside, one or more selected from the group consisting of the camera 121b, a speaker, the flash 124, and the manipulation unit provided on the rear surface of the terminal body may be formed in the rear surface case 103 and the rear cover 200, respectively.

Referring to FIG. 11, holes 201, 202, and 203 are formed in the rear cover 200 to correspond to locations in which the camera 121b, the flash 124, and the second sound output unit 152b are provided, respectively, so that the camera 121b, the flash 124, and the second sound output unit 152b may be exposed to the outside.

Further, hole coating parts 230 are formed in the holes 201, 202, and 203 of the rear cover 200, and the holes formed in the rear surface case 103, so that the rear cover 200 and the rear surface case 103 may be coupled to each other in areas in which the holes 201, 202 and 203 are formed. The hole coating parts 230 may be urethane coating blocking boundaries between the rear surface case 103 and the rear cover 200.

The hole coating parts 230 may be formed to have shapes corresponding to the shapes of the coated holes, and one or more selected from the group consisting of the camera 121b, the speaker, the flash 124, and the manipulation unit may be exposed through an internal space of the hole coating parts 230, which is formed by the hole coating parts 230.

Areas of the rear cover 200, in which the holes 201, 202, and 203 are formed, may be also firmly coupled to the rear surface case 103. In this case, the rear cover 200 and the rear surface case 103 may be firmly coupled to each other.

FIG. 12 is a sectional view taken along line C-C' of FIG. 8, and FIG. 13 is a sectional view illustrating a terminal hole according to the embodiment of the present invention.

Referring to FIGS. 12 and 13, a terminal hole 193 into which an earphone pin or a charging pin is to be inserted may be formed on a side surface of the mobile terminal 100. The terminal hole 193 may be formed on the side surface of the mobile terminal 100. The terminal hole 193 may be formed between a groove 102*a* recessed forwards from the terminal body and the rear surface case 103.

The forwards-recessed groove 102*a* may be formed in the terminal body, particularly, the rear case 102, and a terminal hole defining part 1010 defining the terminal hole 193 together with the groove 102*a* may be formed in the rear surface case 103. The terminal hole defining part 1010 may protrude from the side surface of the rear surface case 103.

An end 1010*a* of the terminal hole defining part 1010 may be exposed to the outside through a space between the rear cover 200 and the rear case 102. Further, the rear cover 200 may cover the side surfaces of the rear surface case 103 while helping the terminal hole defining part 1010 to be exposed to the outside. An avoidance groove 208 avoiding the terminal hole defining part 1010 may be formed in the rear cover 200. The avoidance groove 208 of the rear cover 200 surrounds the edge 1010 of the rear surface case 103 in an area of the mobile terminal, in which the terminal hole 193 is formed.

Further, the terminal hole defining part 1010 of the rear surface case 103 may face the forwards-recessed groove 102*a* of the rear case 102, and the terminal hole 193 may be penetrated between the terminal hole defining part 1010 and the groove 102*a* of the rear case 102. When a portion of the rear cover 200 defines the terminal hole 193 together with the rear case 102, the rear cover 200 may be separated due to insertion/withdrawal of the earphone pin or the charging pin. However, in the present embodiment, the avoidance groove 208 of the rear cover 200 surrounds the terminal hole defining part 1010 of the rear surface case 103 in the area in which the terminal hole 193 is formed, the earphone pin or the charging pin does not interfere in and contact the rear cover 200 when being inserted/withdrawn, and the rear surface case 103 and the rear cover 200 may be firmly coupled to each other.

FIG. 14 is a cutaway perspective view illustrating another example of the rear cover according to the embodiment of the present invention.

Referring to FIG. 14, the bent parts 210 of the rear cover 200 may be coupled to portions of the front surfaces 1004 of the rear surface case 103. Thus, each of the front surfaces 1004 of the rear surface case 103 may be partitioned into a coupling part 1004*a* coupled to the rear cover 200 and a non-coupling part 1004*b* not coupled to the rear cover 200.

The coupling part 1004*a*, which is a portion of the front surface 1004 of the rear surface case 103 which is covered by the corresponding bent part 210, may be a portion of the front surface 1004 of the rear surface case 103, which is coupled to the bent part 210 of the rear cover 200.

The non-coupling part 1004*b*, which is a portion of the front surface 1004 of the rear surface case 103 which is not covered by the bent part 210, may be understood as a distance between an edge of the inner surface 1003 of the rear surface case 103 and the bent part 210, and may be the other portion of the front surface 1004 of the rear surface case 103, which is not coupled to the bent part 210 of the rear cover 200.

The coupling part 1004*a*, which is a portion of the front surface 1004 of the rear surface case 103 and the corresponding side surface 1002 of the rear surface case 103, may be coupled to the bent part 210 by the corresponding adhesive part 220.

The adhesive part 220 may be formed in at least one of an area between the side surface 1002 of the rear surface case 103 and the bent part 210 and an area between the portion 1004*a* of the front surface 1004 of the rear surface case 103 and the bent part 210.

The rear surface case 103 may be detachably coupled to the rear case 102, and the coupling scheme may be achieved by a boss and a groove formed at an edge of the rear surface case 103 and an edge of the rear case 102, respectively.

Thus, when the bent parts 201 cover the entire front surfaces 1004 of the rear surface case 103, the rear surface case 103 may be separated from the rear surface of the rear case 102. Thus, in the present embodiment, gaps are provided between the bent parts 210 and the rear case 102, so that the rear surface case 103 may be stably attached to the rear case 102.

FIG. 15 is a rear view illustrating a rear cover according to another embodiment of the present invention, and FIG. 16 is a sectional view taken along line I-I' of FIG. 15.

The present embodiment is different from the embodiment of the present invention in terms of a stitch structure, and the other configurations except for the stitch structure according to the present embodiment are identical to those according to the embodiment of the present invention. Hereinafter, only characteristic configurations according to the present embodiment will be described, the same configurations as those according to the embodiment will be cited for those according to the embodiment, and description thereof will be omitted.

Referring to FIGS. 15 and 16, a stitch structure 250 is formed on the rear surface of the rear cover 200. The stitch structure 250 extends from an upper end to a lower end of the rear cover 200, to partition the rear surface of the rear cover 200 into a left area and a right area.

The stitch structure 250 includes an inwards-recessed folded part 252 and stitch parts 254 extending from opposite sides of the folded part 252 in a lengthwise direction thereof.

The folded part 252 extends downwards from an upper end of the rear surface of the rear cover 200 in a lengthwise direction thereof. As an example, the folded part 252 may be formed by heating an I-shaped jig and compressing the heated jig to the front side. When the heated jig is compressed to an area in which the folded part 252 is to be formed, the folded part 252, the shape of which is deformed as the folded part 252 is compressed by the jig, may be formed in the rear cover 200. Thus, the folded part 252 is formed to have the shape of a groove forwards recessed in the rear cover 200.

Further, the stitch parts 254 are formed on opposite sides of the folded part 252 through backstitch of a thread passing through a hole.

In the related art, to implement a stitch structure, a folded part is formed in a state in which two surfaces are in contact with each other. However, in the present embodiment, an effect obtained in the state in which the two surfaces are in contact with each other may be achieved by compressing the rear surface of the rear cover in a desired shape through the heated jig.

Further, because the folded part 252 is formed to have a groove structure, when the rear surface of the mobile terminal 100 is in contact with the ground or the base, the mobile terminal 100 may be more firmly supported on the ground or the base.

Meanwhile, an accommodation groove forwards recessed to implement the groove structure of the folded part 252 and accommodating the folded part 252 may be likewise formed in an area of the rear surface of the rear surface case 103, which corresponds to an area in which the folded part 252 is formed.

A mobile terminal according to the present invention has the following effects.

The mobile terminal has an advantage in that adhesive parts configured to couple a rear surface case and a rear cover are formed at an edge of the rear surface case and an edge of the rear cover along the edge of the rear surface case, so that separation of the edge of the rear cover may minimally occur.

Further, the mobile terminal has an advantage in that the adhesive parts are formed of urethane, so that a process is simple, and the coupling by the adhesive parts may be consistently maintained.

The invention claimed is:

1. A case assembly comprising:
    a rear surface case detachably coupled to a rear surface of a terminal body to cover the rear surface of the terminal body;
    a rear cover coupled to a rear surface of the rear surface case to protect the rear surface of the rear surface case; and
    an adhesive sheet provided between the rear surface case and the rear cover to provide an adhesive force to opposite surfaces so as to couple the rear cover to the rear surface of the rear surface case,
    wherein adhesive parts configured to couple the rear cover and the rear surface case to each other along an edge of the rear surface case are formed in the edge of the rear surface case and an area of the rear cover, which covers the edge of the rear surface case, and
    wherein the adhesive parts are apart from the adhesive sheet.

2. The case assembly of claim 1, wherein the adhesive parts are urethane coating.

3. The case assembly of claim 1, wherein the rear cover comprises:
    a body covering the rear surface of the rear surface case; and
    bent parts which are bent forwards from a circumferential edge of the body, which cover side surfaces of the rear surface case, and portions of which cover front surfaces of the rear surface case, and
    wherein the adhesive parts are located in at least one of an area between the bent parts and the side surfaces of the rear surface case and an area between the bent parts and the front surfaces of the rear surface case.

4. The case assembly of claim 1, wherein the rear cover comprises:
    a body covering the rear surface of the rear surface case; and
    bent parts which are bent forwards from a circumferential edge of the body, which cover side surfaces of the rear surface case, and portions of which cover portions of front surfaces of the rear surface case, and
    wherein the adhesive parts are located in at least one of an area between the bent parts and the side surfaces of the rear surface case and an area between the bent parts and the portions of the front surfaces of the rear surface case.

5. The case assembly of claim 1, wherein the rear cover is formed of one or more selected from the group consisting of natural leather, artificial leather, and fabric.

6. The case assembly of claim 1, wherein holes configured to expose, to the outside, one or more selected from the group consisting of a camera, a speaker, a flash, and a manipulation unit provided on the rear surface of the terminal body are formed in the rear surface case and the rear cover, respectively, and
    wherein hole coating parts are formed in the hole of the rear surface case and the hole of the rear cover.

7. The case assembly of claim 6, wherein the hole of the rear cover is formed through laser processing.

8. The case assembly of claim 6, wherein the hole coating parts are urethane coating blocking boundaries between the rear surface case and the rear cover.

9. The case assembly of claim 1, wherein a forwards-recessed groove is formed in the terminal body,
    wherein a terminal hole defining part defining a terminal hole together with the groove protrudes from the rear surface case, and
    wherein an avoidance groove avoiding the terminal hole defining part is formed in the rear cover.

* * * * *